US012752661B2

(12) United States Patent
Motohira

(10) Patent No.: US 12,752,661 B2
(45) Date of Patent: Oct. 6, 2026

(54) VEHICLE AND CHARGING SYSTEM

(71) Applicant: TOYOTA JIDOSHA KABUSHIKI KAISHA, Toyota (JP)

(72) Inventor: Akito Motohira, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1048 days.

(21) Appl. No.: 17/861,754

(22) Filed: Jul. 11, 2022

(65) Prior Publication Data

US 2023/0018075 A1 Jan. 19, 2023

(30) Foreign Application Priority Data

Jul. 13, 2021 (JP) ................................ 2021-115661

(51) Int. Cl.

| | |
|---|---|
| ***H02J 7/00*** | (2026.01) |
| ***B60L 53/10*** | (2019.01) |
| ***B60L 53/30*** | (2019.01) |
| ***B60L 53/62*** | (2019.01) |
| ***B60L 53/66*** | (2019.01) |
| ***H02J 7/04*** | (2006.01) |
| ***H02J 7/42*** | (2026.01) |
| ***H02J 7/47*** | (2026.01) |

(52) U.S. Cl.

CPC ............... *B60L 53/66* (2019.02); *B60L 53/11* (2019.02); *B60L 53/305* (2019.02); *B60L 53/62* (2019.02); *H02J 7/04* (2013.01); *H02J 7/42* (2026.01); *H02J 7/47* (2026.01); *H02J 2207/40* (2020.01)

(58) Field of Classification Search

USPC ......................................................... 320/109

See application file for complete search history.

(56) References Cited

U.S. PATENT DOCUMENTS

| | | | | |
|---|---|---|---|---|
| 10,703,269 | B2 * | 7/2020 | Kusumi | B60Q 9/00 |
| 2019/0070971 | A1 | 3/2019 | Kusumi et al. | |
| 2019/0241085 | A1 * | 8/2019 | Hiroe | B60L 53/16 |
| 2022/0105823 | A1 * | 4/2022 | Metzger | H02J 7/007182 |

FOREIGN PATENT DOCUMENTS

| | | | |
|---|---|---|---|
| CN | 106505846 | A | 3/2017 |
| CN | 112886687 | A | 6/2021 |
| DE | 10 2020 125 970 | A1 | 4/2022 |
| JP | 2019-047677 | A | 3/2019 |
| JP | 2019-140721 | A | 8/2019 |
| WO | 2012/165071 | A1 | 12/2012 |

* cited by examiner

*Primary Examiner* — Samuel Berhanu
(74) *Attorney, Agent, or Firm* — Sughrue Mion, PLLC

(57) ABSTRACT

A vehicle is a vehicle in which a mounted power storage is charged with electric power from a charging facility, the vehicle including a communication unit that obtains a first voltage value indicating an outputtable voltage value that can be outputted from the charging facility and a processing unit that transmits to the charging facility, a third voltage value which is equal to or smaller than the first voltage value as a maximum voltage of the power storage when a second voltage value indicating a maximum voltage value of the power storage is larger than the first voltage value.

3 Claims, 10 Drawing Sheets

VEHICLE AND CHARGING SYSTEM

This nonprovisional application is based on Japanese Patent Application No. 2021-115661 filed with the Japan Patent Office on Jul. 13, 2021, the entire contents of which are hereby incorporated by reference.

BACKGROUND

Field

The present disclosure relates to a vehicle and a charging system.

Description of the Background Art

A charging system including a charging facility provided outside a vehicle and a vehicle including a power storage has conventionally been known (Japanese Patent Laying-Open No. 2019-47677).

SUMMARY

According to the charging system, when a maximum voltage of the power storage mounted on the vehicle is higher than a maximum output voltage of the charging facility, the charging facility may not start charging. Charging of the power storage of the vehicle up to an allowable extent, however, may be desired.

The present disclosure was made in view of the problem as above, and an object thereof is to provide a vehicle and a charging system that can cause a charging facility to start charging even when a maximum voltage of a power storage mounted on the vehicle is higher than a maximum output voltage of the charging facility.

A vehicle according to the present disclosure is a vehicle in which a mounted power storage is charged with electric power from a charging facility, the vehicle including a communication unit that obtains a first voltage value indicating an outputtable voltage value that can be outputted from the charging facility and a processing unit that transmits to the charging facility, a third voltage value equal to or smaller than the first voltage value as a charging voltage upper limit value when a second voltage value indicating a maximum voltage value of the power storage is larger than the first voltage value.

A charging system according to the present disclosure includes a vehicle on which a power storage is mounted and a charging facility that supplies electric power to the power storage. The charging facility transmits a first voltage value indicating an outputtable voltage value that can be outputted from the charging facility to the vehicle. When a second voltage value indicating a maximum voltage value of the power storage is larger than the first voltage value, the vehicle transmits to the charging facility, a third voltage value equal to or smaller than the first voltage value as a charging voltage upper limit value.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
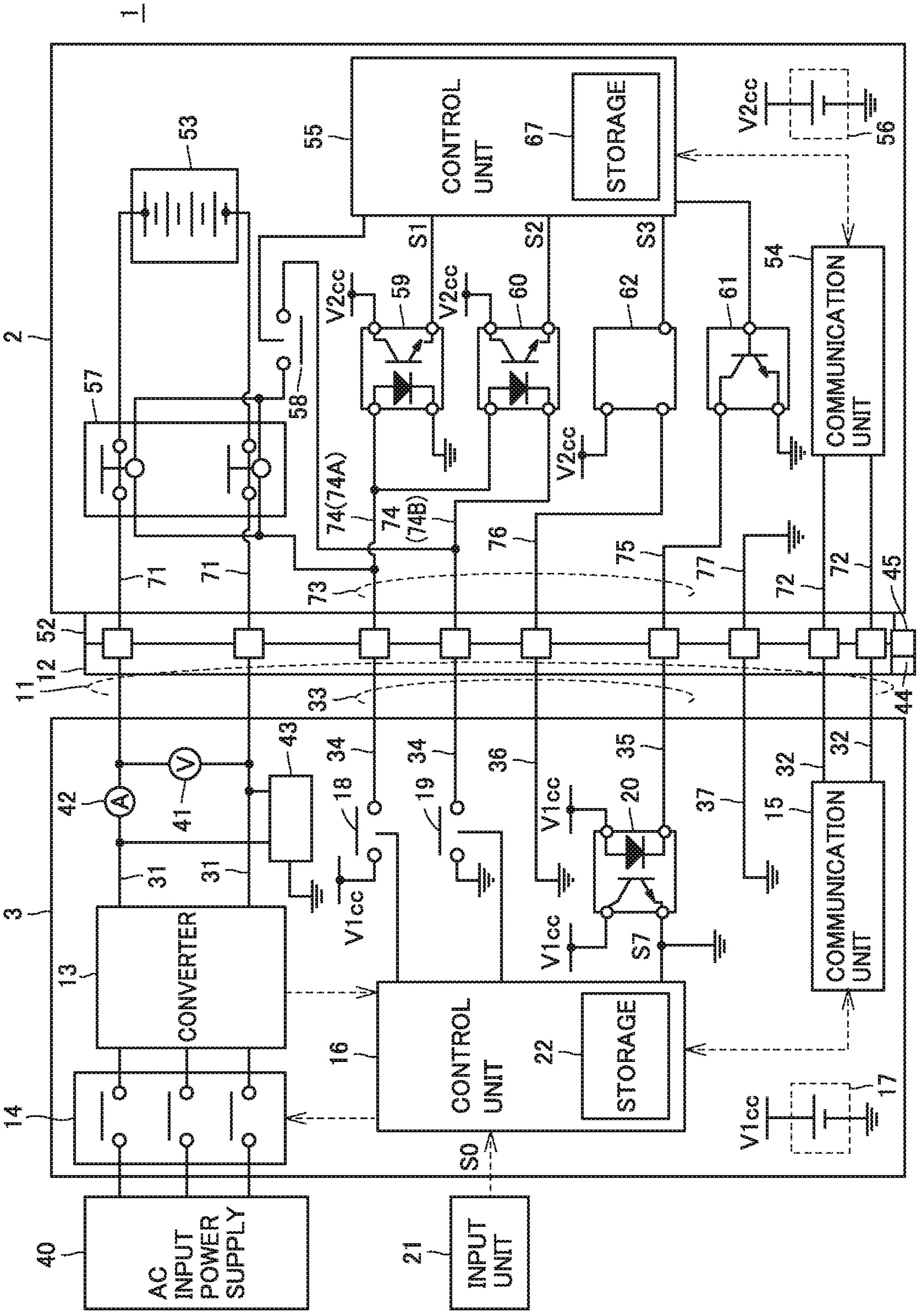
FIG. 1 is a block diagram schematically showing a charging system 1 according to a first embodiment.

A charging system and a vehicle according to the present embodiment will be described with reference to FIGS. 1 to 10. The same or substantially the same features among features shown in FIGS. 1 to 10 have the same reference characters allotted and redundant description will not be provided.

First Embodiment

FIG. 1 is a block diagram schematically showing charging system 1 according to a first embodiment. Charging system 1 includes a vehicle 2 and a charging facility 3.

Charging facility 3 includes a charging cable 11, a facility-side connector 12, a converter 13, an earth leakage breaker (ELB) 14, a communication unit 15, a control unit 16, a controlled power supply 17, relays 18 and 19, a photocoupler 20, and an input unit 21.

Charging cable 11 includes a pair of charging lines 31, a pair of communication lines 32, and a control line 33.

Charging lines 31 and 31 are power lines through which charging power is supplied to vehicle 2. Communication lines 32 and 32 are communication lines for communication with vehicle 2. Control line 33 includes a pair of charging start and stop lines 34 and 34, a connector connection confirmation line 35, a charging prohibition and permission line 36, and a ground line 37.

Facility-side connector 12 is provided at a tip end of charging cable 11. Facility-side connector 12 includes a terminal connected to charging line 31, a terminal connected to communication line 32, a terminal connected to control line 33, a terminal connected to charging start and stop line 34, a terminal connected to connector connection confirmation line 35, a terminal connected to charging prohibition and permission line 36, and a terminal connected to ground line 37.

Facility-side connector 12 is provided with a latch 45 and a latch holding circuit 44. Latch 45 prevents facility-side connector 12 from being detached from a vehicle-side connector 52 by connection and engagement of facility-side connector 12 with vehicle-side connector 52. Latch holding circuit 44 holds a state of engagement by latch 45 so as to prevent facility-side connector 12 from being detached from vehicle-side connector 52 during charging.

Converter 13 is connected to an alternating-current (AC) input power supply 40. AC input power supply 40 includes an AC/direct-current (DC) rectifier, a DC/AC inverter, an insulation transformer, and an AC/DC rectifier.

A voltmeter 41 is provided between a terminal of facility-side connector 12 and AC input power supply 40, and measures a voltage across charging lines 31 and 31. Voltmeter 41 transmits a measured voltage value to control unit 16. An ammeter 42 is provided in one charging line 31. Voltmeter 41 transmits the measured voltage value to control unit 16. A ground-fault sensing device 43 is connected to each charging line 31 and ground line 37. Ground-fault sensing device 43 transmits a result of sensing to control unit 16.

Converter 13 converts AC power supplied from AC input power supply 40 to DC power. ELB 14 is arranged between converter 13 and AC input power supply 40 and electrically connects and disconnects converter 13 and AC input power supply 40 to and from each other.

Communication unit 15 communicates with vehicle 2 based on such a communication protocol as controller area network (CAN).

Control unit 16 controls converter 13, ELB 14, communication unit 15, relays 18 and 19, photocoupler 20, and the like.

Control unit 16 includes a storage 22. An outputtable voltage value V0 or the like is stored in storage 22.

Controlled power supply 17 is a power supply that supplies drive electric power to communication unit 15, control unit 16, relays 18 and 19, photocoupler 20, and the like.

Relay 18 is connected between a positive electrode side of controlled power supply 17 and charging start and stop line 34 and connects and disconnects a positive electrode of controlled power supply 17 and charging start and stop line 34 to and from each other based on a control signal from control unit 16.

Relay 19 is connected between a negative electrode (a ground voltage) of controlled power supply 17 and charging start and stop line 34 and connects and disconnects the negative electrode of controlled power supply 17 and charging start and stop line 34 to and from each other based on a control signal from control unit 16.

Photocoupler 20 transmits to control unit 16, an advance preparation checking signal S7 in accordance with whether or not connector connection confirmation line 35 can conduct. In photocoupler 20, when an on current flows to a light emitting element on an input side, a light reception element on an output side outputs advance preparation checking signal S7 to control unit 16.

Input unit 21 is an interface operated by a user, and it is implemented, for example, by a touch panel. The user can start charging by pressing a charging start button shown on input unit 21. When the charging start button is pressed in input unit 21, a charging start trigger S0 is transmitted to control unit 16.

Vehicle 2 will now be described.

Vehicle 2 includes vehicle-side connector 52, a power storage 53, a communication unit 54, a control unit 55, a control-system power supply 56, relays 57 and 58, photocouplers 59 and 60, a switch 61, and a sensing circuit 62.

Vehicle 2 includes a pair of charging lines 71, a pair of communication lines 72, and a control line 73. Control line 73 includes a pair of charging start and stop lines 74 (74A and 74B), a connector connection line 75, a charging permission and prohibition line 76, and a ground line 77. A terminal corresponding to each line is provided in vehicle-side connector 52.

When facility-side connector 12 is connected to vehicle-side connector 52, terminals provided in facility-side connector 12 and vehicle-side connector 52 are connected to each other. Electrical connection between charging line 31 and charging line 71, between communication line 32 and communication line 72, between charging start and stop line 34 and charging start and stop line 74, between connector connection confirmation line 35 and connector connection line 75, between charging prohibition and permission line 36 and charging permission and prohibition line 76, and between ground line 37 and ground line 77 is established.

Power storage 53 is a secondary battery that supplies electric power to a drive apparatus including a drive motor and an inverter that have vehicle 2 travel. Communication unit 54 communicates with charging facility 3 based on such a communication protocol as CAN.

Control unit 55 controls drive of communication unit 54, control-system power supply 56, relays 57 and 58, photocoupler 59, and the like. Control-system power supply 56 is a power supply that supplies electric power to each device such as communication unit 54, control unit 55, and control-system power supply 56.

Control unit 55 includes a storage 67 where information including a battery maximum voltage value V1 and a battery withstand upper limit value V4 of power storage 53 are stored. Battery maximum voltage value V1 refers, for example, to a voltage of power storage 53 in a fully charged state. Battery maximum voltage value V1 may be, for example, a voltage value of power storage 53 when an SOC thereof is 80%.

Battery withstand upper limit value V4 refers to a voltage at which vehicle 2 stops charging for protection of power storage 53.

Relay 57 connects and disconnects charging line 71 and power storage 53 to and from each other. Relay 57 is open in a normal state. When relay 58, relay 18, and relay 19 are closed, drive electric power is supplied from controlled power supply 17 of charging facility 3 to relay 57.

When drive electric power is supplied to relay 57, relay 57 is closed so that power storage 53 and charging line 71 are connected to each other.

Relay 58 has one end connected to one charging start and stop line 74A connected to relay 18 and has the other end connected to the other charging start and stop line 74B connected to relay 19. When relays 18 and 19 and relay 58 are closed, drive electric power is supplied to relay 57 so that relay 57 is closed.

When relay 18 is closed while connectors are connected to each other, photocoupler 59 transmits an advance preparation cue signal S1 to control unit 55. Specifically, photocoupler 59 includes a light emitting element connected to charging start and stop line 74A and a ground potential and a light reception element connected between control unit 55 and control-system power supply 56.

When relay 18 is closed while the connector is connected, the light emitting element emits light and the light receiving element receives light. Then, the light receiving element transmits advance preparation cue signal S1 to control unit 55.

While connectors are connected to each other, photocoupler 60 transmits a charging start cue signal S2 to control unit 55 in accordance with open and closed states of relays 18 and 19. Specifically, the photocoupler includes a light emitting element connected to charging start and stop line 74A and charging start and stop line 74B and a light receiving element connected to control-system power supply 56 and the ground potential.

When relays 18 and 19 are closed while the connectors are connected to each other, the light emitting element emits light and the light receiving element receives light. Then, the light receiving element transmits charging start cue signal S2 to control unit 55.

When an on current is supplied from control unit 55 while the connectors are connected to each other, switch 61 has connector connection line 75 electrically conduct.

Specifically, switch 61 is connected between connector connection line 75 and the ground potential. When the on current is supplied from control unit 55 to switch 61, switch 61 has connector connection line 75 connected to the ground potential.

Figure 2:
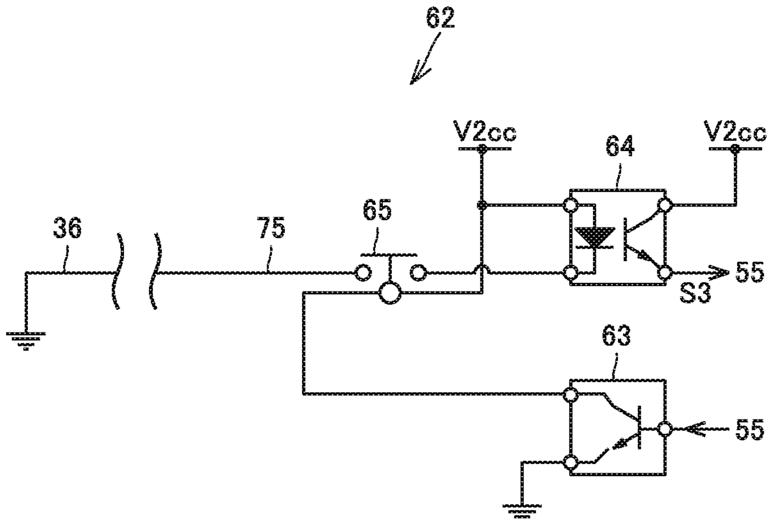
FIG. 2 is a block diagram showing a sensing circuit 62.

FIG. 2 is a block diagram showing sensing circuit 62. While facility-side connector 12 and vehicle-side connector 52 are connected to each other, sensing circuit 62 transmits a connector connection confirmation signal S3 to control unit 55. Sensing circuit 62 includes a switch 63, a photocoupler 64, and a switch 65. When an ignition switch of vehicle 2 is turned ON, an on current is supplied from control unit 55 to switch 63 so that switch 63 is turned ON. When switch 63 is turned ON, switch 65 is closed to electrically connect connector connection line 75 and photocoupler 64 to each other. Photocoupler 64 includes a light emitting element and a light receiving element.

When switch 65 is closed, the light emitting element is supplied with drive electric power from controlled power supply 17 to emit light. The light receiving element receives light from the light emitting element and transmits connector connection confirmation signal S3 to control unit 55.

Figure 3:
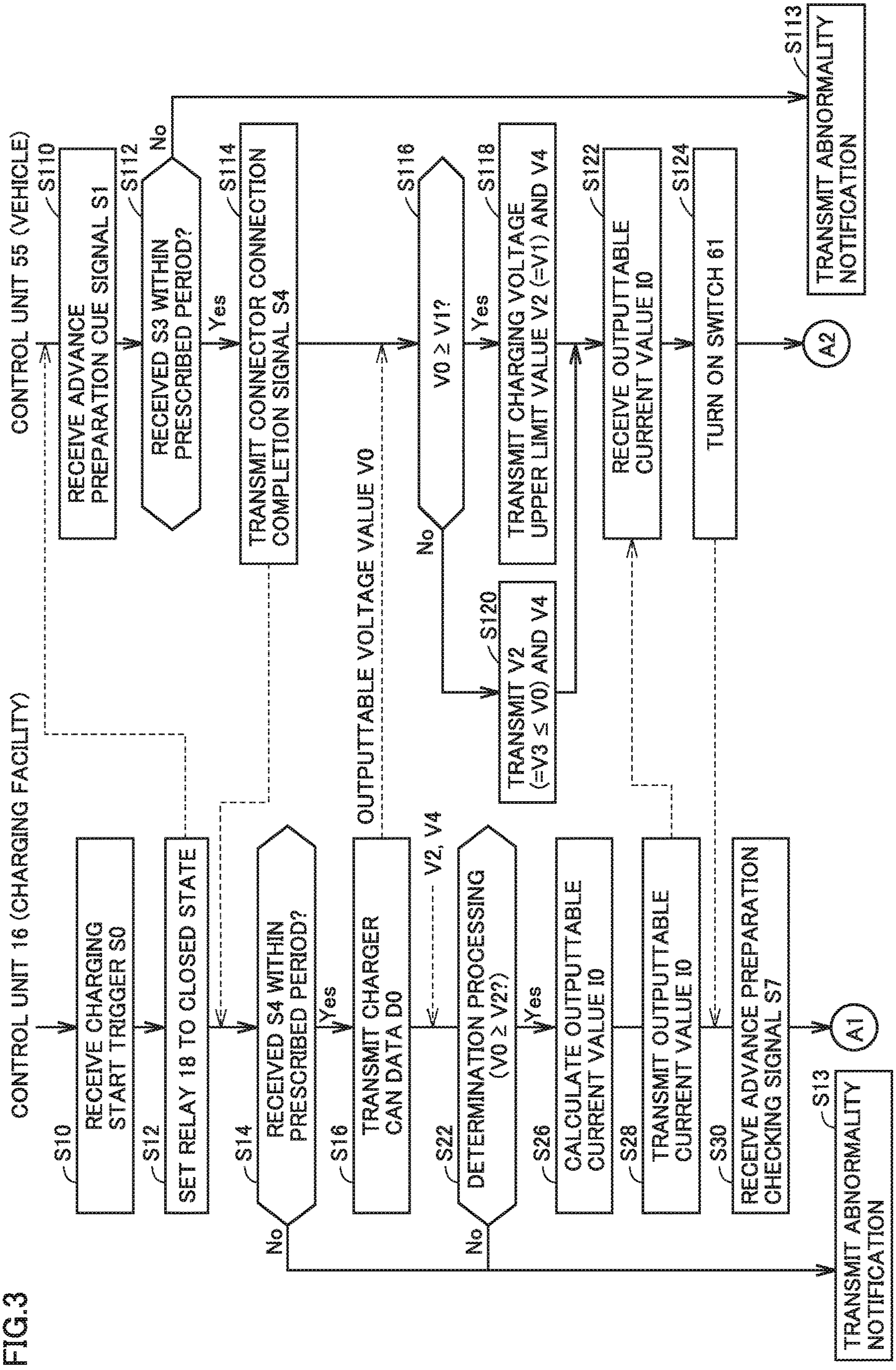
FIGS. 3 and 4 are each a flowchart showing a charging flow from connection of each connector until start of charging.
Figure 4:
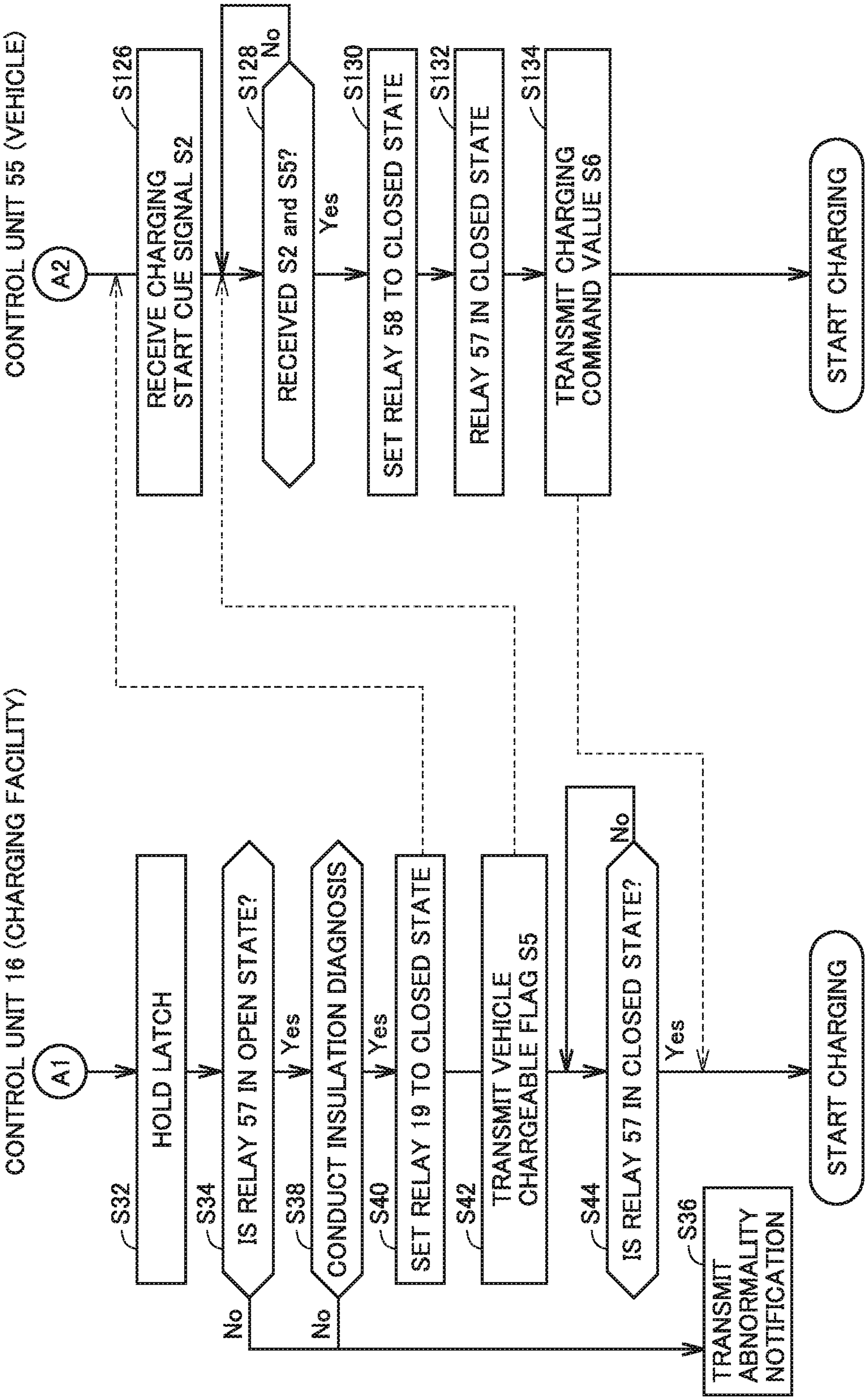

FIGS. 3 and 4 are each a flowchart showing a charging flow from connection of each connector until start of charging. In the specification, FIG. 3, and the like, "S" means "Step".

When control unit 16 receives a charging start trigger S0 (S10) while facility-side connector 12 and vehicle-side connector 52 are connected to each other, control unit 16 has relay 18 closed (S12). When relay 18 is closed, photocoupler 59 transmits advance preparation cue signal S1 to control unit 55. Charging start trigger S0 is transmitted from input unit 21 to control unit 16 in accordance with an operation by a user.

When control unit 55 receives advance preparation cue signal 51, control unit 55 determines whether or not it has received connector connection confirmation signal S3 (S112).

When control unit 55 determines that it has not received connector connection confirmation signal S3 (No in S112), control unit 55 notifies charging facility 3 of an abnormality (S113).

When control unit 55 determines that it has received connector connection confirmation signal S3 (Yes in S112), control unit 55 transmits a connector connection completion signal S4 to control unit 16 through communication line 72 and communication line 32 (S114).

Control unit 16 determines whether or not it has received connector connection completion signal S4 within a prescribed period (S14). When control unit 16 determines that it has received connector connection completion signal S4 within the prescribed period (Yes in S14), control unit 16 transmits charger CAN data D0 to control unit 55 through communication line 32 and communication line 72. Charger CAN data D0 includes outputtable voltage value V0 of charging facility 3.

Control unit 55 determines whether or not outputtable voltage value V0 is equal to or larger than battery maximum voltage value V1 (S116). When control unit 55 determines that outputtable voltage value V0 is equal to or larger than battery maximum voltage value V1 (Yes in S116), control unit 55 transmits charging voltage upper limit value V2 and battery withstand upper limit value V4 to control unit 16 (S118). At this time, charging voltage upper limit value V2 is equal to battery maximum voltage value V1. Charging voltage upper limit value V2 is a value transmitted from control unit 55 to control unit 16 as a maximum voltage value of power storage 53.

When control unit 55 determines that battery maximum voltage value V1 is larger than outputtable voltage value V0 (No in S116), control unit 55 transmits charging voltage upper limit value V2 and battery withstand upper limit value V4 to control unit 16 (S120). At this time, charging voltage upper limit value V2 is set to maximum voltage value V3 and maximum voltage value V3 is a value equal to or smaller than outputtable voltage value V0. Maximum voltage value V3 may be set as outputtable voltage value V0.

When control unit 16 receives charging voltage upper limit value V2, it performs determination processing (S22).

Specifically, the control unit determines whether or not outputtable voltage value V0 is equal to or larger than charging voltage upper limit value V2 (S22). When outputtable voltage value V0 is equal to or larger than charging voltage upper limit value V2, control unit 16 determines that power storage 53 can fully be charged.

On the other hand, when charging voltage upper limit value V2 is larger than outputtable voltage value V0, control unit 16 determines that power storage 53 cannot fully be charged.

Therefore, when charging voltage upper limit value V2 is larger than outputtable voltage value V0, control unit 16 transmits an abnormality notification to control unit 55 (S13). This abnormality notification may include a battery inapplicability notification indicating that power storage 53 cannot fully be charged. Then, control unit 16 does not start charging.

When control unit 16 determines that outputtable voltage value V0 is equal to or larger than charging voltage upper limit value V2 (Yes in S22), control unit 16 calculates an outputtable current value I0 (S26).

Outputtable current value I0 is calculated based on a smaller one of battery withstand upper limit value V4 and outputtable voltage value V0. Control unit 16 transmits outputtable current value I0 to control unit 55 (S28).

When control unit 55 receives outputtable current value I0 (S122), it turns ON switch 61 (S124). When switch 61 is turned ON, the light emitting element of photocoupler 20 emits light and the light reception element of photocoupler 20 receives light. The light receiving element of photocoupler 20 transmits advance preparation checking signal S7 to control unit 16. Control unit 16 thus receives advance preparation checking signal S7 (S30).

In FIG. 4, when control unit 16 receives advance preparation checking signal S7, it has the latch held (S32). Specifically, latch holding circuit 44 is driven to hold a locked state of latch 45.

Then, control unit 16 checks whether or not relay 57 is open (S34). Specifically, when a voltage value obtained from voltmeter 41 is equal to or smaller than a prescribed voltage, the control unit determines that relay 57 is open, and when the control unit determines that the voltage value obtained from voltmeter 41 is higher than the prescribed voltage, the control unit determines that relay 57 is closed.

When control unit 16 determines that relay 57 is closed (No in S34), control unit 16 transmits an abnormality notification to control unit 55 (S36).

When control unit 16 determines that relay 57 is open (Yes in S34), control unit 16 conducts insulation diagnosis (S38).

Specifically, the control unit has converter 13 driven and outputs a prescribed voltage. Then, the control unit conducts insulation diagnosis on a side of charging facility 3 based on the current value obtained from ammeter 42 and an output value from ground-fault sensing device 43.

When control unit 16 determines that there is an abnormality as a result of insulation diagnosis (No in S38), it transmits an abnormality notification to control unit 55 (S36).

When control unit 16 determines that there is no problem as a result of insulation diagnosis (Yes in S38), it has relay 19 closed (S40). When relay 19 is closed with relay 18 having already been closed, the light emitting element of photocoupler 60 emits light and the light receiving element of photocoupler 60 receives light. Then, the light receiving element of photocoupler 60 transmits charging start cue signal S2 to control unit 55. Control unit 55 thus receives charging start cue signal S2 (S126).

Control unit 16 transmits a vehicle chargeable flag S5 (S42). Vehicle chargeable flag S5 is transmitted to control unit 16 through communication line 32 and communication line 72.

Control unit 55 determines whether or not it has received charging start cue signal S2 and vehicle chargeable flag S5 (S128). When control unit 55 receives vehicle chargeable flag S5 and charging start cue signal S2 (Yes in S128), it has relay 58 closed (S130).

When relay 58 is closed, drive electric power is supplied from controlled power supply 17 to relay 57. Relay 57 is thus closed (S132).

Control unit 16 confirms that relay 57 is closed (S44). Specifically, when relay 57 is closed, a voltage of power storage 53 is applied to voltmeter 41. Then, when a voltage value obtained from voltmeter 41 is equal to or larger than a prescribed value, control unit 16 determines that relay 57 is closed.

Control unit 55 transmits a charging command value S6 to control unit 16 (S134). Control unit 55 sets charging command value S6 to a value smaller than outputtable current value I0. When control unit 16 determines that relay 57 is closed (Yes in S44), it starts charging based on charging command value S6.

In charging system 1 according to the present first embodiment, when control unit 55 determines that battery maximum voltage value V1 is larger than outputtable voltage value V0 in S116 to S120, it transmits maximum voltage value V3 equal to or smaller than outputtable voltage value V0 as charging voltage upper limit value V2.

Therefore, control unit 16 of charging facility 3 determines that charging voltage upper limit value V2 is larger than outputtable voltage value V0 and absence of start of charging can be suppressed. Consequently, charging is started and power storage 53 can be charged to some extent.

Second Embodiment

Figure 5:
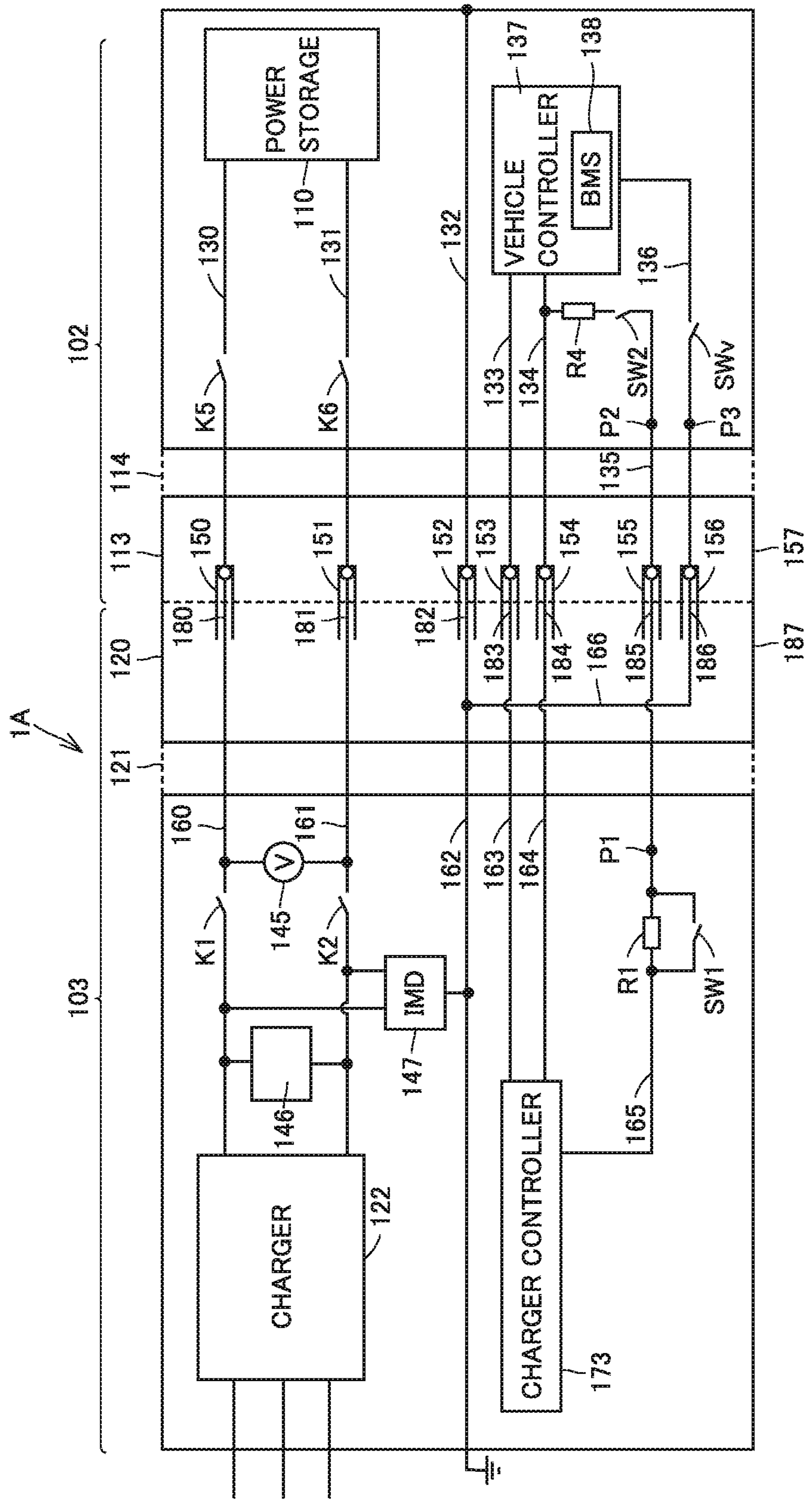
FIG. 5 is a block diagram schematically showing a charging system 1A according to a second embodiment.

FIG. 5 is a block diagram schematically showing a charging system 1A according to a second embodiment.

Charging system 1A includes a vehicle 102 and a charging apparatus 103. Vehicle 102 includes a power storage 110, a charging inlet 113, power wiring 114, and a vehicle controller 137.

Charge inlet 113 includes a DC (+) terminal 150, a DC (−) terminal 151, a PE terminal 152, an S (+) terminal 153, an S (−) terminal 154, a CC1 terminal 155, a CC2 terminal 156, and a housing 157. Terminals 150 to 156 are accommodated in housing 157 and insulated.

Vehicle 102 includes vehicle controller 137, a DC (+) wire 130, a DC (−) wire 131, a PE line 132, an S (+) signal line 133, an S (−) signal line 134, a CC1 communication line 135, a CC2 communication line 136, vehicle controller 137, contactors K5 and K6, and switches SW2 and SWv.

DC (+) wire 130 and DC (−) wire 131 are connected to power storage 110. DC (+) wire 130 is connected to DC (+) terminal 150 and DC (−) wire 131 is connected to DC (−) terminal 151. PE line 132 is a grounding line and connected to PE terminal 152.

S (+) signal line 133, S (−) signal line 134, CC1 communication line 135, and CC2 communication line 136 are connected to vehicle controller 137. S (+) signal line 133 is connected to S (+) terminal 153 and S (−) signal line 134 is connected to S (—) terminal 154. CC1 communication line 135 is connected to CC1 terminal 155 and CC2 communication line 136 is connected to CC2 terminal 156.

Contactor K5 is provided in DC (+) wire 130 and contactor K6 is provided in DC (−) wire 131. A resistor R4 is connected to CC1 communication line 135 and switch SW2 is connected to CC1 communication line 135 in series to resistor R4. Switch SWv is provided in CC2 communication line 136. Vehicle controller 137 controls switching ON/OFF of contactors K5 and K6 and switches SW2 and SWv.

Vehicle controller 137 is provided with a battery management system (BMS) 138.

Charging apparatus 103 includes a charger 122, a DC (+) wire 160, a DC (−) wire 161, a PE line 162, an S (+) signal line 163, an S (−) signal line 164, a CC1 communication line 165, a CC2 communication line 166, a contactor K1, a contactor K2, a switch S1, a voltage measurement apparatus 145, a bleeder circuit 146, an insulation monitoring device (IMD) 147, and a charger controller 173.

A plug 120 includes a DC (+) terminal 180, a DC (−) terminal 181, a PE terminal 182, an S (+) terminal 183, an S (−) terminal 184, a CC1 terminal 185, a CC2 terminal 186, and a housing 187. The terminals are accommodated in housing 187.

DC (+) wire 160 and DC (−) wire 161 are connected to charger 122. DC (+) wire 160 is connected to DC (+) terminal 180 and DC (−) wire 161 is connected to DC (−) terminal 181. PE line 162 is a grounding line and connected to PE terminal 182.

S (+) signal line 163, S (—) signal line 164, and CC1 communication line 165 are connected to charger controller 173. S (+) signal line 163 is connected to S (+) terminal 183 and S (−) signal line 164 is connected to S (−) terminal 184. CC1 communication line 165 is connected to CC1 terminal 185 CC2 communication line 166 has one end connected to PE line 162 and the other end connected to CC2 terminal 186.

Contactor K1 is provided in DC (+) wire 160 and contactor K2 is provided in DC (−) wire 161. CC1 communication line 165 is provided with a resistor R1 and switch SW1 is connected to CC1 communication line 165 in parallel to resistor R1.

Voltage measurement apparatus 145 is provided to connect DC (+) wire 160 and DC (−) wire 161 to each other. Specifically, the voltage measurement apparatus is connected between DC (+) terminal 180 and contactor K1 of DC (+) wire 160 and between DC (−) terminal 181 and contactor K2 of DC (−) wire 161.

IMD 47 is provided to connect DC (+) wire 160 and DC (−) wire 161 to each other between charger 122 and contactors K1 and K2. IMD 147 is further connected also to PE line 162. Bleeder circuit 146 is provided to connect DC (+) wire 160 and DC (−) wire 161 to each other between charger 122 and contactors K1 and K2.

While plug 120 is connected to charge inlet 113, DC (+) terminal 150 and DC (+) terminal 180 are connected to each other and DC (−) terminal 151 and DC (−) terminal 181 are connected to each other. PE terminal 152 is connected to PE terminal 182 and S (+) terminal 153 is connected to S (+) terminal 183. S (−) terminal 154 is connected to S (−) terminal 184 and CC1 terminal 155 is connected to CC1 terminal 185. CC2 terminal 156 is connected to CC2 terminal 186.

Vehicle controller 137 periodically monitors detection points P2 and P3 and charger controller 173 periodically monitors a detection point P1.

Charger controller 173 controls charger 122, switching ON/OFF of switch SW1, and switching ON/OFF of contactors K1 and K2.

Vehicle controller 137 controls switching ON/OFF of switch SW2 and switch SWv and controls switching ON/OFF of contactors K5 and K6.

As plug 120 is connected to charge inlet 113 as above, various types of control for charging are carried out.

Figure 6:
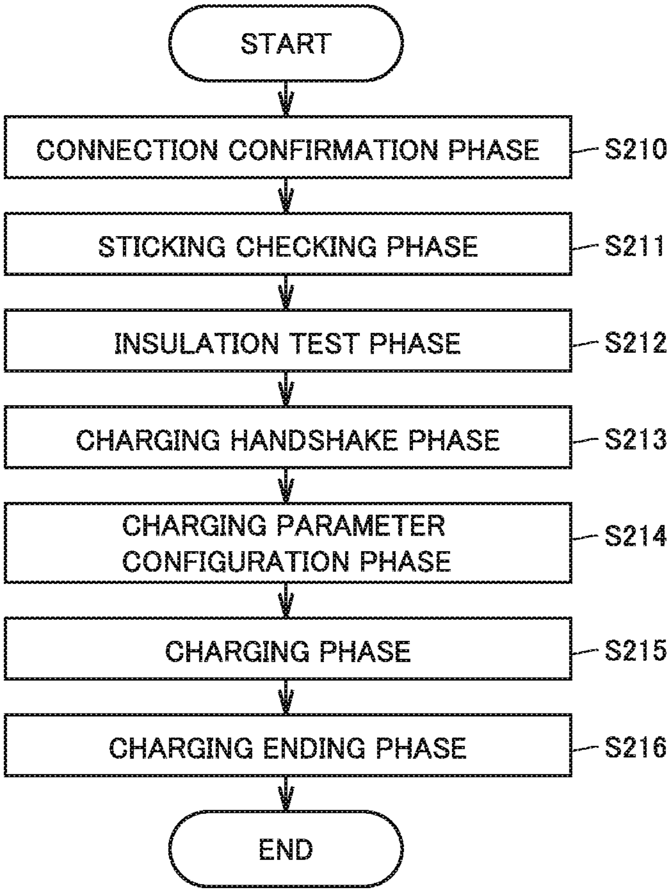
FIG. 6 is a flowchart showing overview of a charging flow.

FIG. 6 is a flowchart showing overview of a charging flow. In FIG. 6, the charging flow includes a connection confirmation phase (S210), a sticking checking phase (S211), an insulation test phase (S212), a charging handshake phase (S213), a charging parameter configuration phase (S214), a charging phase (S215), and a charging ending phase (S216).

In the connection confirmation phase, whether or not charge inlet 113 and plug 120 are connected to each other is checked.

In FIG. 5, in a non-connected state T0 (a state that charge inlet 113 and plug 120 are not connected to each other), switches SW1, SW2, and SWv, contactors K1 and K2, and contactors K5 and K6 are open. At this time, a voltage at detection point P1 is, for example, at 12 V. A voltage at detection point P2 is at 0 V.

In a connected state T1 (a state that plug 120 is inserted in charge inlet 113), witches SW1, SW2, and SWv, contactors K1 and K2, and contactors K5 and K6 are open. Detection point P1 is at 2.95 V, detection point P2 is at 2.25 V, and detection point P3 is at 0 V. In other words, as plug 120 is fitted into charge inlet 113, the voltage at detection point P1 varies from 12 V to 2.95 V and the voltage at detection point P2 varies from 0 V to 2.25 V.

Then, charger controller 173 can sense fitting of plug 120 into charge inlet 113 by sensing variation in voltage at detection point P1. Vehicle controller 137 can sense fitting of plug 120 into charge inlet 113 by sensing variation in voltage at detection point P2.

At wake-up T2 after connected state T1, switch SW1 is closed. Then, when the voltage at detection point P1 attains to 8.98 V, charger controller 173 starts transmission of a charging handshake message. Various messages are carried out through S (+) signal line 163 and S (+) signal line 133 as well as S (−) signal line 164 and S (−) signal line 134.

Vehicle controller 137 detects the voltage at detection point P2 being at 8.28 V and confirms connection between CC1 communication line 136 and CC1 communication line 166 to each other. Then, vehicle controller 137 starts transmission and reception of a message to and from charger controller 173.

At wake-up T3 after wake-up T2, charger controller 173 has switch SWv closed. Thereafter, vehicle controller 173 detects the voltage at detection point P3 and determines a version of a connected charging apparatus based on the voltage at detection point P3. For example, when the voltage at detection point P3 is at 6 V, vehicle controller 137 makes determination as connection to a ChaoJi charger.

After vehicle controller 137 determines the version of the charging apparatus connected to charge inlet 113, vehicle controller 137 has switch SWv opened.

At wake-up T4 after wake-up T3, vehicle controller 137 turns ON an electronic lock to lock charge inlet 113 and plug 120. The connection confirmation phase (S210) is thus completed.

The sticking checking phase (S211) will now be described. In the sticking checking phase, whether or not contactors K5 and K6 are stuck is detected. Specifically, contactor K5 and contactor K6 are in an open (OFF) state, and while charger controller 173 has contactor K1 and contactor K2 set to the open state (OFF), voltage measurement apparatus 145 measures a voltage. Then, when the voltage measured by voltage measurement apparatus 145 does not exceed, for example, 10 V, charger controller 173 determines that contactor K5 and contactor K6 are not stuck.

The insulation test phase (S212) will now be described.

Vehicle controller 137 sets contactors K1 and K2 to a closed state (ON). Contactor K5 and contactor K6 are in the open (OFF) state. Then, charger controller 173 has charger 122 provide electric power and conducts an insulation test with the use of IMD 147. For example, the charger controller checks insulation between DC (+) wire 160 and PE line 162 and insulation between DC (−) wire 161 and PE line 162.

Then, when charger controller 173 confirms absence of a problem in each insulated state, it drives bleeder circuit 146 and thereafter sets contactor K1 and contactor K2 to the open (OFF) state. The insulation test phase thus ends.

Referring back to FIG. 6, in the handshake phase (S213), BMS 138 and charger controller 173 exchange a version message, discharging compatibility information, and an identification message.

Figure 7:
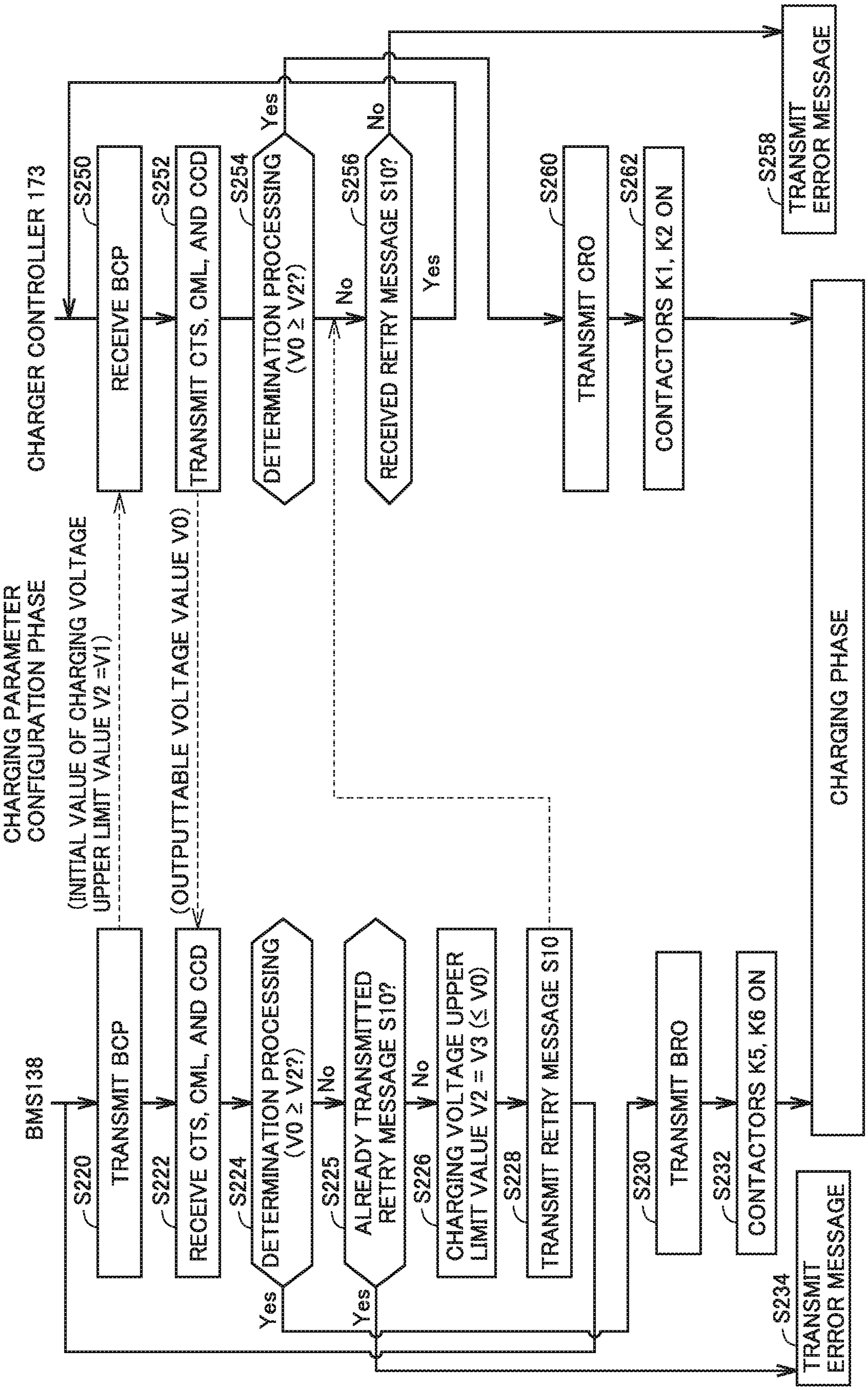
FIG. 7 is a flowchart showing a charging parameter configuration phase (S214).

The charging parameter configuration phase (S214) will now be described. After the charging handshake phase is completed, charger controller 173 and BMS 138 transmit and receive various charge parameter messages and determine whether or not both of them can carry out charging. FIG. 7 is a flowchart showing the charging parameter configuration phase (S214).

BMS 138 transmits a battery charge parameter message BCP of a motive power storage battery to charger controller 173 (Step 220).

Battery charge parameter message BCP includes information showing charging voltage upper limit value (maximum allowable charging total voltage) V2, a highest allowable charging current value, and a highest allowable temperature of power storage 10. Charging voltage upper limit value V2 as the initial value has been set to battery maximum voltage value V1.

Charging voltage upper limit value V2 is a value transmitted from BMS 138 to charger controller 173 as a maximum voltage of power storage 110. Battery maximum voltage value V1 is a voltage of power storage 110, for example, at the time when power storage 110 is fully charged. Battery maximum voltage value V1 may be a voltage value of power storage 110 when the SOC of power storage 110 is 80%.

When charger controller 173 receives battery charge parameter message BCP (S250), charger controller 173 transmits a charger time synchronization information message CTS, a charger max output parameter message CML, and a charger charge and discharge direction request message CCD (S252).

Charger time synchronization information message CTS includes time synchronization information transmitted from charger controller 173 to BMS 138.

Charger max output parameter message CML includes information showing outputtable voltage value (highest output voltage) V0, a lowest output voltage value, a maximum output current value, and a minimum output current value.

Charger charge and discharge direction request message CCD includes information indicating a charge and discharge direction from charging apparatus 103. For example, "00" indicates charging and "01" indicates discharging.

BMS 138 performs determination processing based on outputtable voltage value V0 included in charger max output parameter message CML (S224). Specifically, the BMS determines whether or not outputtable voltage value V0 is equal to or larger than charging voltage upper limit value V2. The initial value of charging voltage upper limit value V2 has been set to battery maximum voltage value V1. In first determination processing, whether or not outputtable voltage value V0 is equal to or larger than battery maximum voltage value V1 is determined.

When BMS 138 determines that outputtable voltage value V0 is equal to or larger than charging voltage upper limit value V2 (Yes in S224), BMS 138 transmits a battery charging readiness state message BRO (S230).

Battery charging readiness state message BRO is a message in which BMS 138 indicates to charging apparatus 103, completion of stand-by for charging. In the stand-by state, BMS 138 sets contactors K5 and K6 to the closed (ON) state (S232). Then, BMS 138 quits charging parameter configuration phase S214.

After charger controller 173 transmits charger time synchronization information message CTS and the like, it performs determination processing (S254). Specifically, the charger controller determines whether or not outputtable voltage value V0 is equal to or larger than charging voltage upper limit value V2. The initial value of charging voltage upper limit value V2 stored in battery charge parameter message BCP is equal to battery maximum voltage value V1. Therefore, in performing determination processing for the first time, charger controller 173 determines whether or not outputtable voltage value V0 is equal to or larger than battery maximum voltage value V1.

When charger controller 173 determines that outputtable voltage value V0 is equal to or larger than charging voltage upper limit value V2 (battery maximum voltage value V1) (Yes in S254), charger controller 173 transmits charger output readiness state message CRO. Charger output readiness state message CRO is a message in which charging apparatus 103 indicates to BMS 138, completion of stand-by for charging. Then, charger controller 173 turns on contactors K1 and K2 (S262).

When BMS 138 determines in S224 that charging voltage upper limit value V2 (battery maximum voltage value V1) is larger than outputtable voltage value V0 (No in S224), BMS 138 determines whether or not it has transmitted a retry message S10 (S225).

When BMS 138 determines that it has not transmitted retry message S10 (No in S225), BMS 138 sets maximum voltage value V3 as charging voltage upper limit value V2 (S226). Specifically, the initial value of charging voltage upper limit value V2 has been set to battery maximum voltage value V1, and BMS 138 updates the value of charging voltage upper limit value V2 to maximum voltage value V3. Maximum voltage value V3 is a value equal to or smaller than outputtable voltage value V0. Outputtable voltage value V0 may be set as maximum voltage value V3.

After BMS 138 updates the value of charging voltage upper limit value V2 (S226), BMS 138 transmits retry message S10 (S228).

Then, BMS 138 transmits again battery charge parameter message BCP (S220). At this time, charging voltage upper limit value V2 included in battery charge parameter message BCP is equal to maximum voltage value V3.

BMS 138 receives again charger time synchronization information message CTS and the like (S222), and performs determination processing (S224). Specifically, BMS 138 determines whether or not outputtable voltage value V0 is equal to or larger than charging voltage upper limit value V2. At this time, charging voltage upper limit value V2 is equal to maximum voltage value V3. Maximum voltage value V3 is equal to or smaller than outputtable voltage value V0.

Therefore, when BMS 138 determines that outputtable voltage value V0 is equal to or larger than charging voltage upper limit value V2 (maximum voltage value V3) (Yes in S224), BMS 138 transmits battery charging readiness state message BRO (S230) and turns ON contactors K5 and K6 (S232).

When charger controller 173 determines in S254 that charging voltage upper limit value V2 is larger than outputtable voltage value V0 (No in S254), charger controller 173 determines whether or not it has received retry message S10 (S256). When charger controller 173 performs determination processing for the first time, battery maximum voltage value V1 has been set as charging voltage upper limit value V2.

When charger controller 173 determines that it has received retry message S10 (Yes in S256), charger controller 173 receives battery charge parameter message BCP from BMS 138 (S250).

At this time, BMS 138 has updated charging voltage upper limit value V2 included in battery charge parameter message BCP to maximum voltage value V3.

Charger controller 173 transmits charger time synchronization information message CTS, charger max output parameter message CML, and charger charge and discharge direction request message CCD (S252).

Then, charger controller 173 performs determination processing again (S254). Specifically, the charger controller determines whether or not outputtable voltage value V0 is equal to or larger than charging voltage upper limit value V2. At this time, charging voltage upper limit value V2 has been set to maximum voltage value V3 and maximum voltage value V3 is a value equal to or smaller than outputtable voltage value V0.

Therefore, charger controller 173 determines that outputtable voltage value V0 is equal to or larger than charging voltage upper limit value V2.

When charger controller 173 determines that outputtable voltage value V0 is equal to or larger than charging voltage upper limit value V2 (Yes in S254), charger controller 173 transmits charger output readiness state message CRO. Charger output readiness state message CRO is a message in which charging apparatus 103 indicates to BMS 138, completion of stand-by for charging. Then, charger controller 173 turns ON contactors K1 and K2 (S262).

When BMS 138 determines in S224 that charging voltage upper limit value V2 is larger than outputtable voltage value V0 (No in S224) and further determines that it has already transmitted retry message S10 (Yes in S225), BMS 138 transmits an error message (S234).

Thus, in the present embodiment, BMS 138 does not transmit second retry message S10.

When charger controller 173 determines in S254 that charging voltage upper limit value V2 is larger than outputtable voltage value V0 and determines that it has not received retry message S10 (No in S256), it transmits the error message (S258).

Then, when contactors K1, K2, K5, and K6 are turned ON in charging parameter configuration phase S214 (S232 and S262), transition to charging phase S215 is made.

In charging phase S215, BMS 138 transmits a demand voltage (V) and a demand current (A) to charger controller 173 and charger controller 173 has electric power supplied to vehicle 102 based on the received demand voltage (V) and demand current (A).

Then, when the SOC of power storage 110 attains to a target SOC, BMS 138 and charger controller 173 quit charging and make transition to charge ending phase S216.

In charge ending phase S216, BMS 138 and charger controller 173 transmit and receive statistic data to and from each other. For example, charger controller 173 transmits to BMS 138, information on a cumulative time period for charging of a semiconductor substrate or the like.

Third Embodiment

A charging system 1B according to a third embodiment will be described with reference to FIG. 8 and the like.

Figure 8:
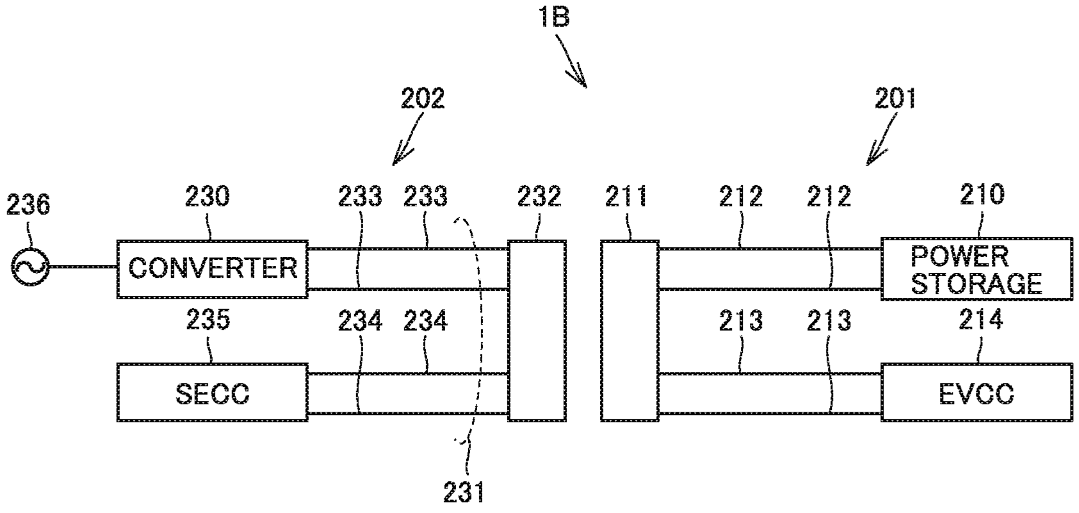
FIG. 8 is a schematic diagram schematically showing a charging system 1B.

FIG. 8 is a schematic diagram schematically showing charging system 1B.

Charging system 1B includes a vehicle 201 and a charging facility 202.

Vehicle 201 includes a power storage 210, a charging connector 211, a power line 212, a control pilot line (CPLT) 213, and an electric vehicle communication controller (EVCC) 214.

Power line 212 is connected to power storage 210 and charging connector 211. CPLT 213 is connected to charging connector 211 and EVCC 214.

Charging facility 202 includes a converter 230, a charging cord 231, a charging plug 232, a power line 233, a CPLT 234, and a supply equipment communication controller (SECC) 235.

Converter 230 is connected to an external power supply 236. Converter 230 converts AC power supplied from external power supply 236 to DC power. Charging plug 232 is provided at a tip end of charging cord 231.

Power line 233 is connected to converter 230 and charging plug 232. CPLT 234 is connected to SECC 235 and charging plug 232.

Figure 9:
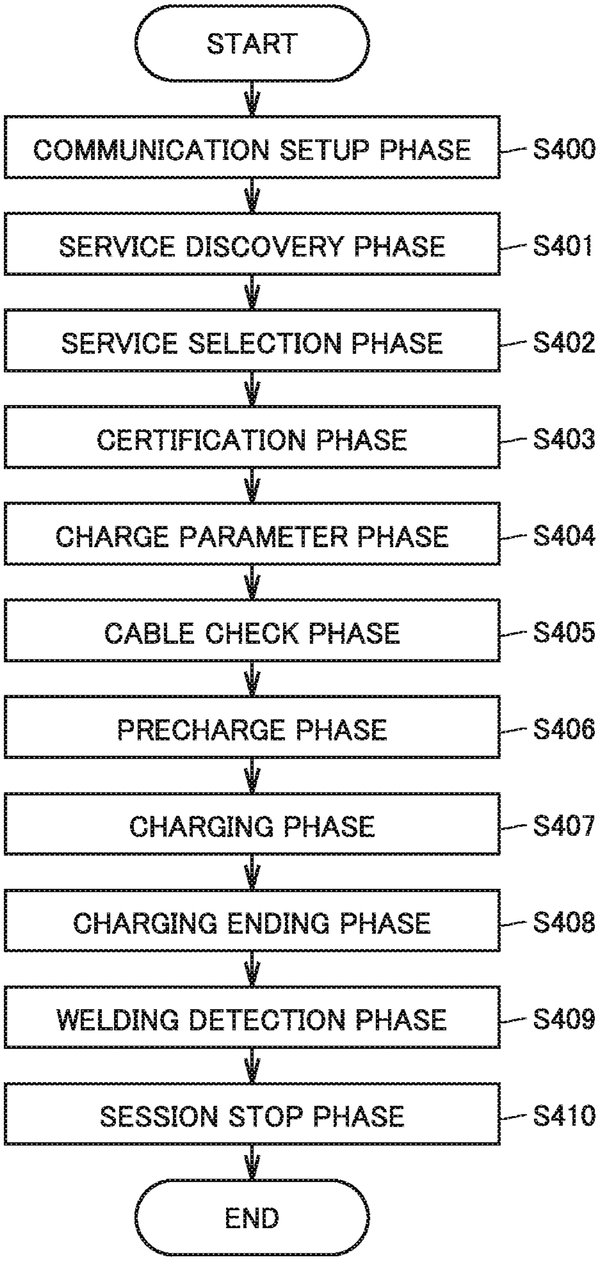
FIG. 9 is a flowchart showing a control flow until start of charging.

FIG. 9 is a flowchart showing a control flow until start of charging.

The charging flow includes a communication setup phase S400, a service discovery phase S401, a service selection phase S402, a certification phase S403, a charge parameter phase S404, a cable check phase S405, a precharge phase S406, a charging phase S407, a charge ending phase S408, a welding detection phase S409, and a session stop phase S410.

In communication setup phase S400, a data link between EVCC 214 and SECC 235 is established.

In service discovery phase S401, EVCC 214 obtains contents of a service provided by charging facility 202.

In service selection phase S402, EVCC 214 selects and fixes the contents of the service received from charging facility 202.

In certification phase S403, EVCC 214 transmits a fee charge system and electric power contract information to SECC 235. SECC 235 has an external secondary actor certify contents of the electric power contract information.

In charge parameter phase S404, information on various charge parameters is exchanged between EVCC 214 and SECC 235.

Figure 10:
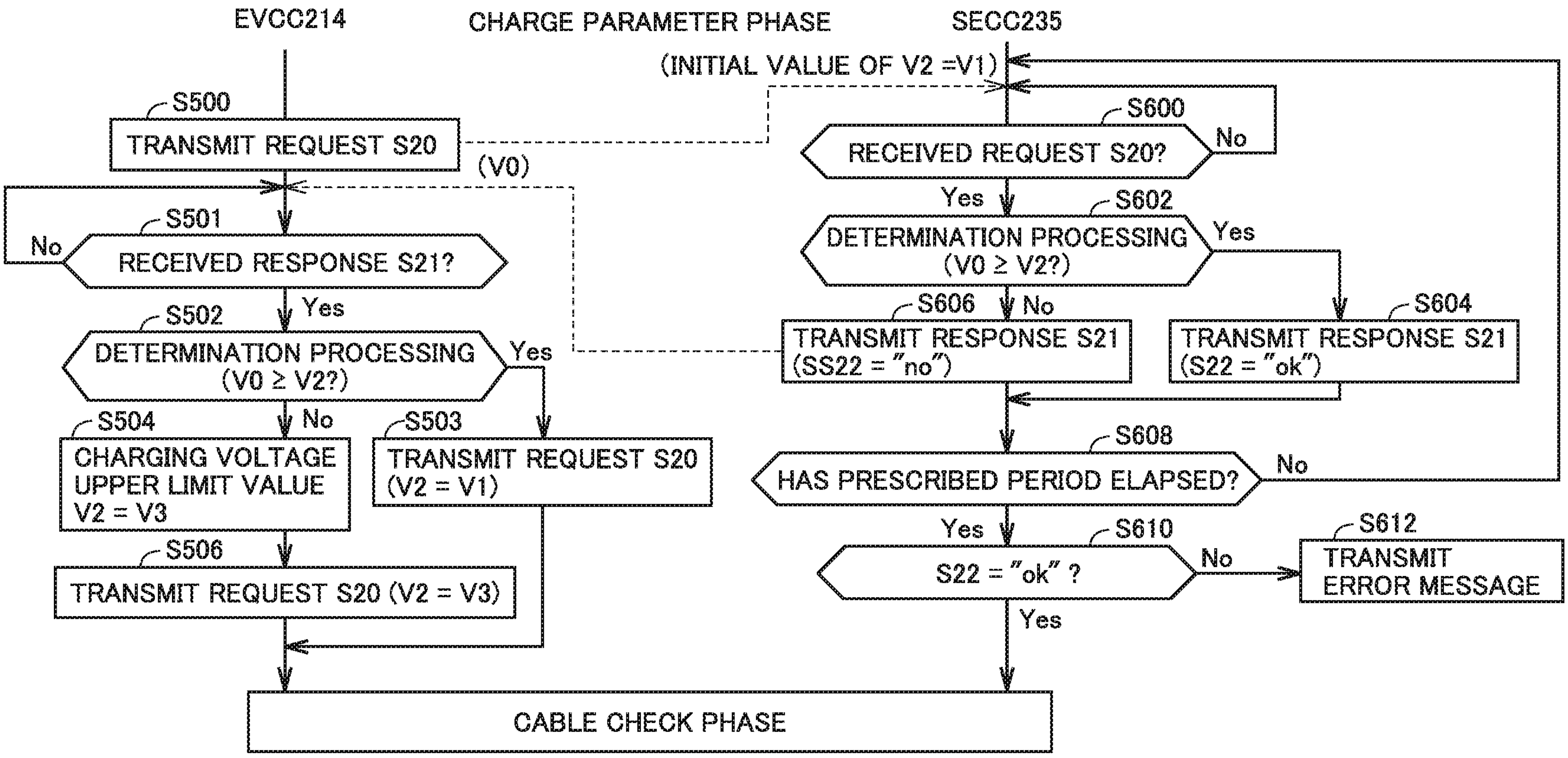
FIG. 10 is a flowchart showing a charge parameter phase S404.

FIG. 10 is a flowchart showing charge parameter phase S404.

EVCC 214 transmits a charge Parameter Discover Req S20 to SECC 235 (S500). This charge Parameter Discover Req S20 includes charging voltage upper limit value V2, the maximum charging current value, and the minimum charging current value. The initial value of charging voltage upper limit value V2 is equal to battery maximum voltage value V1. In the present third embodiment, battery maximum voltage value V1 corresponds to an "EV maximum voltage."

When SECC 235 receives charge Parameter Discover Req S20 (Yes in S600) it performs determination processing (S602). In this determination processing, whether or not outputtable voltage value V0 is equal to or larger than charging voltage upper limit value V2 is determined.

When it is determined that outputtable voltage value V0 is equal to or larger than charging voltage upper limit value V2 (Yes in S602), ChargeParameterDiscoveryRes S21 is transmitted (S604). This ChargeParameterDiscoveryRes S21 includes response code S22, and a code indicating "OK" is stored in response code S22.

On the other hand, when SECC 235 determines that charging voltage upper limit value V2 is larger than outputtable voltage value V0 (No in S602), it transmits ChargeParameterDiscoveryRes S21 (S606). At this time, response code S22 stored in ChargeParameterDiscoveryRes S21 is "No".

Then, when SECC 235 determines that a prescribed period has not elapsed (No in S608), it repeats S600 to S606. SECC 235 determines whether or not the prescribed period has elapsed since reception of charge Parameter Discover Req S20 for the first time.

ChargeParameterDiscoveryRes S21 includes outputtable voltage value V0, a maximum charging power value, and the maximum charging current value. In the present embodiment, outputtable voltage value V0 corresponds to an "EVSEMaximumVoltage".

After EVCC 214 transmits charge Parameter Discover Req S20, it stands by until it receives ChargeParameterDiscoveryRes S21 (S501). When EVCC 214 receives ChargeParameterDiscoveryRes S21 (Yes in S501), it performs determination processing (S502). Specifically, the EVCC determines whether or not outputtable voltage value V0 is equal to or larger than charging voltage upper limit value V2. In the initial state, charging voltage upper limit value V2 has been set to battery maximum voltage value V1.

Then, when EVCC 214 determines that outputtable voltage value V0 is equal to or larger than charging voltage upper limit value V2 (Yes in S502), it transmits again charge Parameter Discover Req S20 (S503). Charging voltage upper limit value V2 of this charge Parameter Discover Req S20 is equal to battery maximum voltage value V1. Then, transition to cable check phase S405 is made.

When EVCC 214 determines that charging voltage upper limit value V2 is larger than outputtable voltage value V0 (No in S502), EVCC 214 sets maximum voltage value V3 as charging voltage upper limit value V2 (S504). Maximum voltage value V3 is a value equal to or smaller than outputtable voltage value V0. Maximum voltage value V3 may be set to a value the same as outputtable voltage value V0.

EVCC 214 transmits again charge Parameter Discover Req S20 (S506). At this time, charging voltage upper limit value V2 included in charge Parameter Discover Req S20 has been set to maximum voltage value V3.

SECC 235 repeats S600 to S606 until a prescribed period elapses since reception of charge Parameter Discover Req S20 for the first time.

Therefore, when SECC 235 receives charge Parameter Discover Req S20 again, it performs determination processing (S602).

At this time, charging voltage upper limit value V2 has been set to maximum voltage value V3 and maximum voltage value V3 is equal to or smaller than outputtable voltage value V0.

Therefore, SECC 235 determines that outputtable voltage value V0 is equal to or larger than charging voltage upper limit value V2 (Yes in S602) and transmits ChargeParameterDiscoveryRes S21 (S604). At this time, response code S22 indicates "OK".

When SECC 235 determines that the prescribed period has elapsed (Yes in S608), SECC 235 determines whether or not final response code S22 indicates "OK" (S610).

When it is determined that response code S22 in last transmitted ChargeParameterDiscoveryRes S21 indicates "OK" (Yes in S610), transition to cable check phase S405 is normally made. On the other hand, when it is determined that response code S22 in last transmitted ChargeParameterDiscoveryRes S21 indicates "NO" (No in S610), SECC 235 transmits the error message (S612). In this case, SECC 235 does not make transition to cable check phase S405.

Referring back to FIG. 9, when EVCC 214 and SECC 235 make transition to cable check phase S405, EVCC 214 and SECC 235 carry out cable check. Specifically, EVCC 214 transmits a CableCheckReq signal to SECC 235. Then, SECC 235 sends back a CableCheckRes signal. Then, EVCC 214 and SECC 235 check whether or not charging plug 232 and charging connector 211 are well connected to each other.

In precharge phase S406, low power is supplied from charging facility 202 to vehicle 201.

Specifically, EVCC 214 transmits a PreChargeReq signal. This PreChargeReq signal includes a target voltage value or the like. SECC 235 transmits a PreChargeRes signal. By thus carrying out advance charging, whether or not each member is normal is checked in advance.

Then, in charging phase S407, full-fledged charging is carried out. Specifically, EVCC 214 transmits a PowerDeliveryReq signal and a CurrentDemandReq signal. At this time, the PowerDeliveryReq signal includes a "Start" flag indicating a request for start of charging. The CurrentDemandReq signal includes, for example, maximum charging power (EVMaximumChargePower), a maximum charging current (EVMaximumChargeCurrent), charging voltage upper limit value V2 (maximum charging voltage (EVMaximumVoltage)), and target charging power (EVTargetEnergyRequest). Charging voltage upper limit value V2 has been set to maximum voltage value V3 when charge Parameter Discover Req S20 has been sent again in S506.

Then, SECC 235 transmits a PowerDeliveryRes signal and a CurrentDemandRes signal. The PowerDeliveryRes signal includes an OK flag which means start of charging. The CurrentDemandRes signal includes an output voltage (EVSEPresentVoltage), an output current (EVSEPresentCurrent), outputtable voltage value V0 (maximum output voltage (EVSEMaximumChargeVoltage)), a maximum output current (EVSEMaximumChargeCurrent), and maximum output power (EVSEMaximumChargePower).

Then, when charging is completed, EVCC 214 transmits the PowerDeliveryReq signal. This PowerDeliveryReq signal includes a "Stop" flag that requests for stop of charging.

SECC 235 sends back the PowerDeliveryRes signal. The PowerDeliveryRes signal includes an OK flag indicating quitting charging. Then, EVCC 214 quits charging.

In welding detection phase S409, EVCC 214 and SECC 235 carry out welding detection. Thereafter, in session stop phase S410, EVCC 214 and SECC 235 quit communication with each other.

According to charging system 1B, in charge parameter phase S404, EVCC 214 adjusts charging voltage upper limit value V2 based on outputtable voltage value V0 and suppresses absence of start of charging.

Vehicle 201 can thus receive electric power from charging facility 202 and power storage 210 can be charged.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A charging system comprising:

a vehicle comprises a power storage and the power storage is mounted on the vehicle; and a charging facility that supplies electric power to the power storage, wherein the charging facility transmits a first voltage value indicating a maximum outputtable voltage value of the charging facility to the vehicle, and when a second voltage value indicating a maximum voltage value of the power storage is larger than the first voltage value, the vehicle transmits to the charging facility, a third voltage value equal to or smaller than the first voltage value as a charging voltage upper limit value, wherein the vehicle transmits the second voltage value as the charging voltage upper limit value before the vehicle obtains the first voltage value, when the vehicle obtains the first voltage value and the second voltage value is larger than the first voltage value, the vehicle transmits a retry message, and after the vehicle transmits the retry message, the vehicle transmits again to the charging facility, the third voltage value as the charging voltage upper limit value, and when the first voltage value is equal to or larger than the charging voltage upper limit value received from the vehicle, the charging facility transmits a charger output readiness state message, when the first voltage value is smaller than the charging voltage upper limit value received from the vehicle and the charging facility receives the retry message, the charging facility transmits the first voltage value to the vehicle, and when the first voltage value is smaller than the charging voltage upper limit value received from the vehicle and when the charging facility does not receive the retry message, the charging facility transmits an error message to the vehicle.

2. The charging system according to claim 1, wherein when the second voltage value is equal to or smaller than the first voltage value, the vehicle transmits to the charging facility, the second voltage value as the charging voltage upper limit value.

3. The charging system according to claim 1, wherein the third voltage value is equal to the first voltage value.

* * * * *